United States Patent [19]

Tonge et al.

[11] Patent Number: 4,724,486
[45] Date of Patent: Feb. 9, 1988

[54] APPARATUS FOR DERIVING INFORMATION SIGNALS FOR COMPONENT TELEVISION VIDEO SIGNAL RECEPTION

[75] Inventors: Gary J. Tonge; Wilfrid B. Harding, both of Winchester, United Kingdom

[73] Assignee: Independent Broadcasting Authority, London, United Kingdom

[21] Appl. No.: 641,957

[22] PCT Filed: Dec. 14, 1983

[86] PCT No.: PCT/GB83/00333

§ 371 Date: Aug. 10, 1984

§ 102(e) Date: Aug. 10, 1984

[87] PCT Pub. No.: WO84/02442

PCT Pub. Date: Jun. 21, 1984

[30] Foreign Application Priority Data

Dec. 14, 1982 [GB] United Kingdom ............... 8235540
Feb. 17, 1983 [GB] United Kingdom ............... 8304446
Jun. 17, 1983 [GB] United Kingdom ............... 8316581

[51] Int. Cl.$^4$ .............................................. H04N 7/08
[52] U.S. Cl. ..................................... 358/142; 358/11; 358/12
[58] Field of Search ............... 358/141, 142, 143, 145, 358/146, 147, 148, 12, 11, 21 R, 23, 20, 17; 370/79

[56] References Cited

U.S. PATENT DOCUMENTS

| | | | |
|---|---|---|---|
| 3,733,432 | 5/1973 | Arimura et al. | 358/17 |
| 3,772,461 | 11/1973 | Horaguchi | 358/20 |
| 3,859,458 | 1/1975 | Takezawa et al. | 358/143 |
| 4,263,610 | 4/1981 | Shanley, II et al. | 358/20 |
| 4,622,577 | 11/1986 | Reitmeier et al. | 358/11 |
| 4,625,230 | 11/1986 | Tan et al. | 358/11 |

OTHER PUBLICATIONS

M. D. Windram, "Multiple Sound Channels in Satellite Broadcasting", IEE Proceedings, Section AAI, vol. 129, No. 7, part A, pp. 528–531, 9/82.

T. S. Robson, "Extended-Definition Television Service", IEE Proceedings, section AAI, vol. 129, No. 7, Part A, pp. 485–492, 9/82.

*Primary Examiner*—James J. Groody
*Assistant Examiner*—David E. Harvey
*Attorney, Agent, or Firm*—Watson Cole Grindle & Watson

[57] ABSTRACT

Receiving apparatus for receiving multiplexed analogue component signals each of which represents a line of a television picture and includes a burst of digital signals, at least one of the multiplexed analogue component signals including at a predetermined location within its digital burst an indication of further information, the apparatus comprising a demodulating device for demodulating received multiplexed analogue component signals, means responsive to the output of the demodulating device for synchronizing the receiving apparatus to the received multiplexed analogue component signals, and a data extraction circuit responsive to the synchronizing means for extracting from the demodulated signals the indication of further information and for controlling the operation of the demodulating device in accordance with the further information.

9 Claims, 8 Drawing Figures

APPARATUS FOR DERIVING INFORMATION SIGNALS FOR COMPONENT TELEVISION VIDEO SIGNAL RECEPTION

BACKGROUND OF THE INVENTION

1. Field of the Invention

The present invention relates to a system for transmitting and/or receiving television video signals in component form, which components have been time compressed and placed sequentially so as to occupy, together with the necessary sync and clamping signals, a period substantially identical to the existing line period e.g. approximately 64 $\mu$S.

2. Prior Art

It has already been proposed to compress the video component signals to such an extent that an audio signal can be included either before or after the video component signal, within the line period. It is preferred that this audio signal takes the form of a digital signal placed before the video components signal. Further, it has been proposed to add to this digital signal a predetermined sequence of digits for use as either a sound or line sync signal.

SUMMARY OF THE INVENTION

We propose that one or more of said predetermined digital sequences can be replaced, preferably by a further digital sequence, in order to signal additional information to a receiver.

The present invention provides receiving apparatus for receiving multiplexed analogue component signals each of which represents a line of a television picture and includes a burst of digital signals, at least one of the multiplexed analogue component signals including at a predetermined location within its digital burst an indication of further information, the apparatus comprising a demodulating device for demodulating received multiplexed analogue component signals, means responsive to the output of the demodulating device for synchronising the receiving apparatus to the received multiplexed analogue component signals, and a data extraction circuit responsive to the synchronising means for extracting from the demodulated signals the indication of further information and for controlling the operation of the demodulating device in accordance with the further information.

BRIEF DESCRIPTION OF THE DRAWINGS

In order that the present invention be more readily understood, reference will now be made to the accompanying drawings, in which.

DETAILED DESCRIPTION OF A PREFERRED EMBODIMENT

The Multiplex Analogue Components (MAC) system for whom television signal transmission replaces the colour subcarrier coding of NTSC, PAL and SECAM with a single method of time compression. The conventional studio colour coder is replaced by a MAC coder which separately time compresses each active picture line (52 $\mu$s nominally) of luminance (Y) and chrominance (alternate lines contain U and V). By using either charge-coupled devices (ie CCDs) or digital storage, these compressed luminance and chrominance components can be placed in sequence within the 64 $\mu$s of each line period. Conventional sync pulses, designed for receiver technology of 30 years ago, are no longer required and are replaced by other synchronisation information within the waveform. The colour subcarrier burst is no longer required, and any timing information required for future developments such as extended definition receivers can be derived from the video and sound/data signals.

This time compression results in a proportionate increase in the bandwidth required to pass the signal. The extra bandwidth of the time-compressed baseband signal can be accommodated within a satellite FM transmission channel, since the spectral width of the FM signal is a function of both the frequency and amplitude of the baseband signals.

Figure 1:
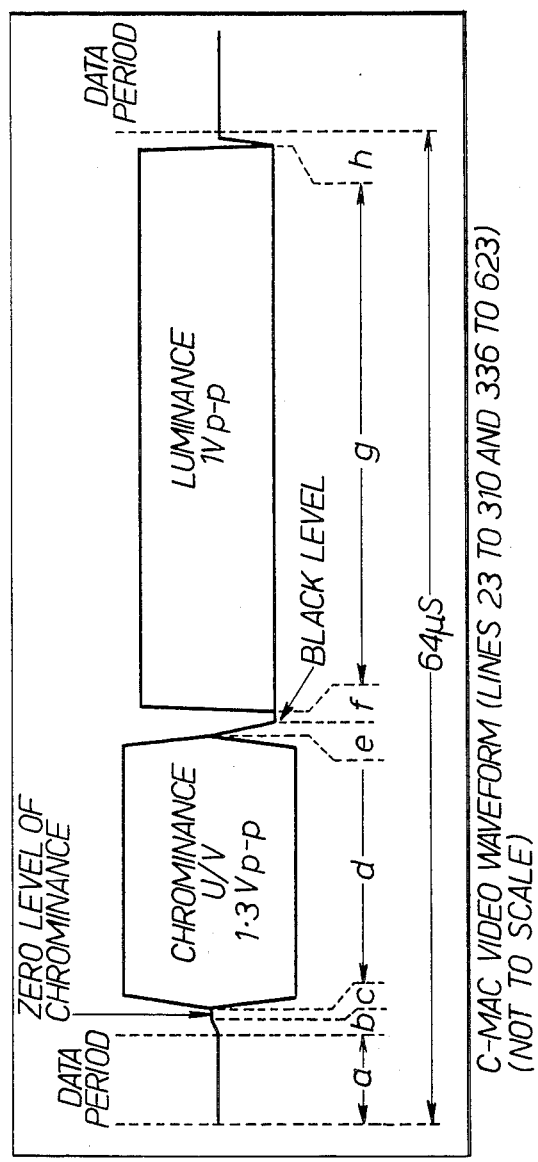
FIG. 1 shows diagrammatically a multiplexed component signal showing the time division multiplex between the component parts thereof.

In one version of MAC known as C-MAC, the synchronisation, sound and data signals are digitally modulated onto the carrier in the line-blanking interval of the MAC signal, giving an overall time division multiplex of the RF carrier as shown in FIG. 1. The complete absence of high frequency sub-carriers either for colour or for sound allows the bandwidth of the baseband signals to be increased with the upper limit set by interference constraints. The use of large amounts of pre- and de-emphasis to reduce distortion on subcarriers becomes unnecessary. As a result, the pre- and de-emphasis can be reduced to a level to give optimum noise and interference performance.

Time division multiplexing of the digital synchronisation, sound and data with the analogue video signal is carried out at an intermediate frequency, switching between digital modulation for the synchronisation, sound and data, and frequency modulation for the chrominance and luminance as shown in FIG. 1. Such switching is carried out without discontinuity of phase in the main carrier.

The internationally agreed studio standard for component-coded digital video has been established with sampling frequencies 13.5 MHz for luminance and 6.75 MHz for chrominance. Luminance compression of 1.5:1 and chrominance compression of 3:1 which are used for C-MAC mean that after compression the effective sampling frequencies for both luminance and chrominance are 20.25 MHz. For convenience of generation and recovery, the same data rate is chosen for the sound signal.

Figure 2:
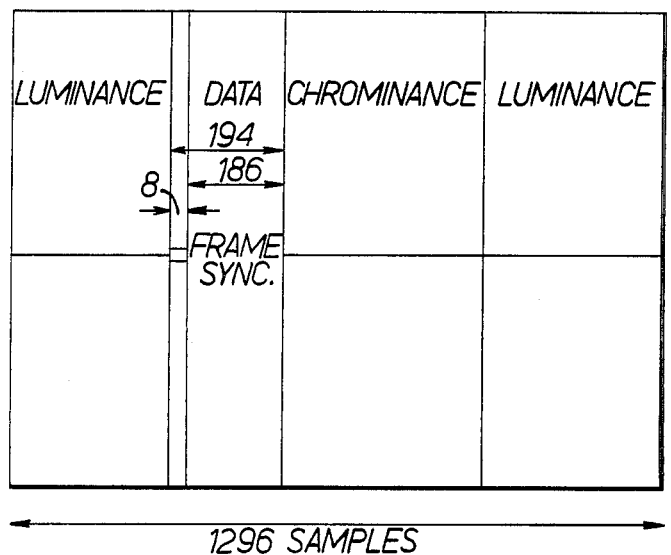
FIG. 2 shows diagrammatically a frame of C-MAC signals offset by $\frac{1}{2}$ frame and $\frac{1}{2}$ line as well as the multiplex timing of each line in the frame.

In defining the waveform, it is convenient to divide the 64 usec video line into 1296 time slots or 'samples' based on integer periods of 49.4 nsec (1/20.25 MHz) which are shown in FIG. 2 which shows the format of a C-MAC signal offset by $\frac{1}{2}$ line and $\frac{1}{2}$ frame.

On this basis, the line is broken into the three component parts of the time division multiplex as shown in Table I.

TABLE I

| Number of bits/samples | Total duration | Function |
|---|---|---|
| 8 bits | 0.40 μsec | digital synchronisation |
| 186 bits | 9.18 μsec | digital sound/data |
| 1102 samples | 54.42 μsec | analogue video(MAC) |

Referring to FIGS. 1 and 2, a line of multiplexed analogue components television signal comprises a first portion (a) which contains signals digitally modulated on to the R.F. carrier in the line blanking interval of the signal. The R.F. carrier is preferably modulated using a form of phase-shift keying shown as 2-4PSK. Following the first portion (a) is a second portion (b) which contains the chrominance and luminance component signals and which is modulated in a different way e.g. frequency modulated.

As shown in FIG. 2, the portion (a) is further divided into a synchronising section and a sound and/or data section.

It is possible to consider the line as made up of a fixed number of equal intervals and the positions of the boundaries of the intervals may be defined by a number. We contemplate using one specific modulation system e.g. 2-4PSK to encode a section of the position (a) so as to constitute what we will call a "unique word". The section used for the "unique word" is in the same position in each line in which it is present. The "unique word" is used to convey information about the structure of the remainder of the signal and particularly enable recovery of the positions of the boundaries referred to above.

The information recovered may be by virtue of the presence or absence of a "unique word" at a predetermined vertical location, and/or by virtue of the bit sequence of the word. The following information may be conveyed:

(1) type of modulation system used between each boundary;
(2) type of service or signal conveyed by the modulation described above;
(3) line and frame synchronisation for vision signal, if carried;
(4) encryption key for some or all of the services; or
(5) any other data to be carried outside of the services themselves.

Using the above system, it is possible to provide video signals indicative of function of different aspect ratio by using a "unique word" to alter the boundaries of the chrominance and luminance information sections. This may mean that the length of the sound/data section has to be reduced and that the compression ratio of the video components has to be altered. Another option would be to use certain lines in the field blanking interval to convey further information. The "unique word" signals one of these to the receiver.

Figure 3:
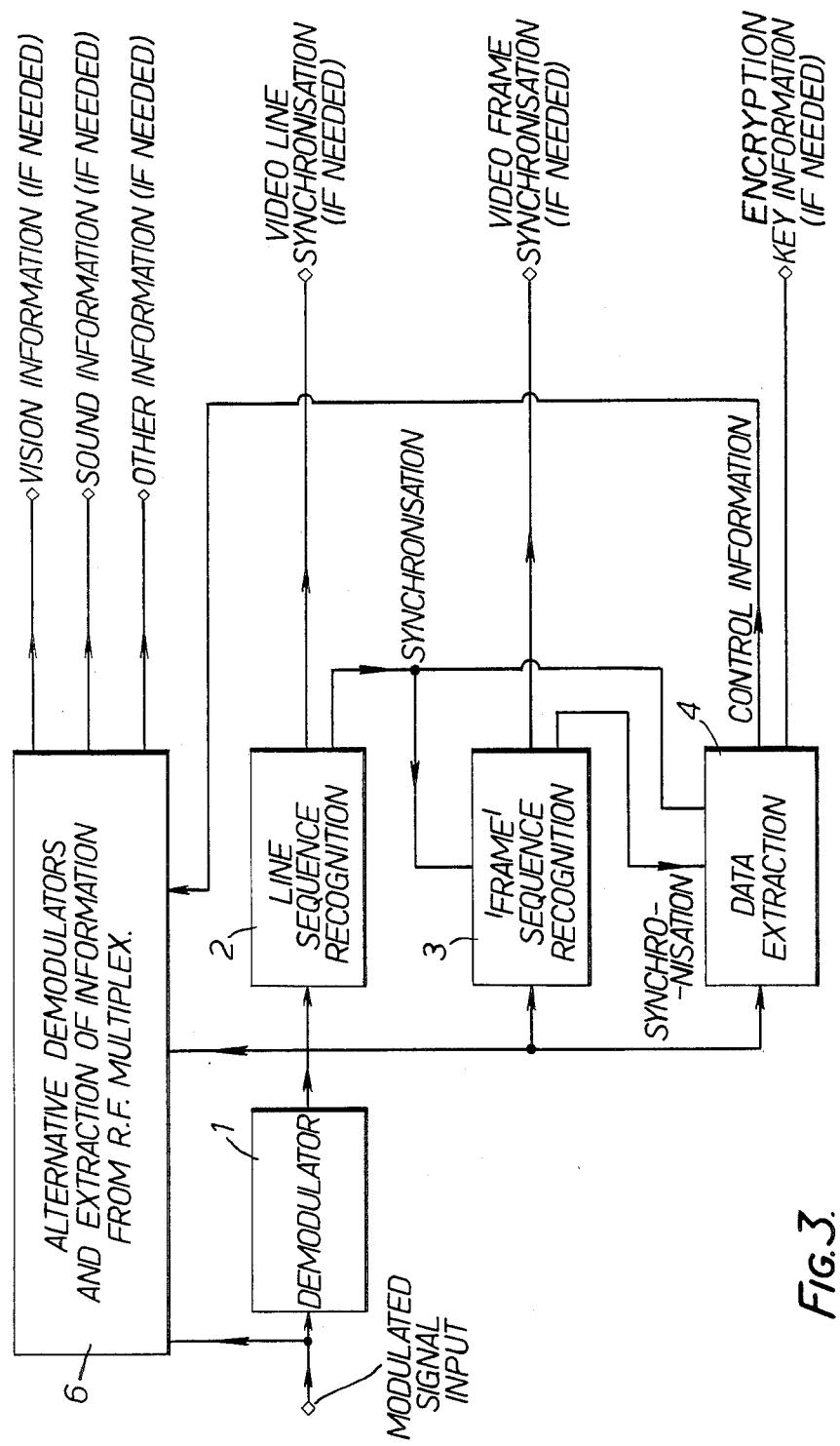
FIG. 3 shows a block diagram of a receiver incorporating the present invention.

Turning now to FIG. 3, there is shown in block diagram terms, a part of a television receiver. A television signal such as that shown in FIG. 1 is received and fed to a demodulator 1 where the digital portion of the signal is demodulated. The output from the demodulator is fed to a line sequence recognition circuit 2, to a frame sequence recognition circuit 3, and to a data extraction circuit 4. The line and frame sequence recognition circuits produce video line and frame synchronising pulses for use by the rest of the receiver circuitry (not shown) as well as providing synchronisation signals to the data extractor circuit 4. The data extraction circuit 4 may be gated by line count from the frame sync so as to be operable only at times when a "unique word" is to be expected. This will reduce the number of errors.

Within the data, there may be a encryption key and this is output, if present, from the data extraction circuit 4. Otherwise, the data extraction circuit may be used to look for and decode one or more "unique words" and the control information deriver therefrom is fed to other circuitry. In this embodiment, it is contemplated that an additional demodulator 6 may be provided and this or the principal demodulator, under the control of the information from the data 'extraction circuit 4' will produce signals indicative of vision information, sound information, or other information or a combination of these.

It will be appreciated that two types of demodulation are required with the above-described MAC signal, one type for the digital portion of the signal and a different type for the vision portion of the signal. The "unique word" can be used to control the demodulating circuit 6 by indicating to the demodulating circuit 6 when to commence and/or stop demodulation of one of the two types of demodulation whereby to enable a receiving apparatus to receive additional sound and/or vision signals outside the usual position determined by the MAC signal described in relation to FIG. 1.

From the above, it will be appreciated that it is necessary to acquire and lock on to the transmitted sync signals before being in a position to extract the "unique words". We will therefore describe how synchronisation of a receiver may be achieved.

Synchronisation signals for C-MAC are:
(i) video line sync
(ii) video frame sync
(iii) U/V identification
(iv) Extended-definition synchronisation
(v) Sound synchronisation
(i) Video line sync: This is available in two ways:
(a) From the digital burst. The first 8 bits of the digital burst carry synchronisation information, consisting of a run-in bit for differential detection and seven bits for the synchronising words. There are two line synchronising words $W_1$ and $W_2$ which are sent on alternate lines. Their relative positions are inverted once every frame to provide a frame reference as shown in Table 2 below.

TABLE 2

| Frame Number | Line Number | Sync Word | Frame Number | Line Number | Sync Word |
|---|---|---|---|---|---|
| even | 620 | $W_2$ | odd | 620 | $W_1$ |
| | 621 | $W_1$ | | 621 | $W_2$ |
| | 622 | $W_2$ | | 622 | $W_1$ |
| | 623 | $W_1$ | | 623 | $W_2$ |
| | 624 | $W_2$ | | 624 | $W_1$ |
| | 625 | $W_2$ | | 625 | $W_1$ |
| | | Frame Boundary | | | |
| odd | 1 | $W_1$ | even | 1 | $W_2$ |
| | 2 | $W_1$ | | 2 | $W_2$ |
| | 3 | $W_2$ | | 3 | $W_1$ |
| | 4 | $W_1$ | | 4 | $W_2$ |
| | 5 | $W_2$ | | 5 | $W_1$ |
| | etc | etc | | etc | etc |

The two line sync words are defined as:
$W_1 = 1\ 0001101$
$W_2 = 0\ 1110010$
Unique words. On 20 lines of each frame, one of the line sync words e.g. the word is replaced with a 7 bit word which may be used for signalling purposes. These lines are as follows:
Even frames—line 26, 58, 74, 90, 152, 182, 198, 216, 276, 308, 324, 340, 400, 432, 458, 466, 526, 558, 574, 590.
Odd frames—line 27, 59, 75, 91, 153, 183, 199, 217, 277, 309, 325, 341, 401, 433, 459, 467, 527, 559, 575, 591.
Even and odd frames are defined in Table 2.
Line syncs may also be derived by detecting a unique frame sync word placed in line 625 as shown in FIG. 2 and using this to lock an oscillator running at line rate.
  (b) From the video waveform. This is provided by the exact spacing of edges 'e' and 'h' of FIG. (2). Edges which may occur in pictures at the same spacing are eliminated by the field sync lines in which there is no picture information. The amplitude of the sync edges (0.5 v) allows for rugged sync separation.
 (ii) Video field sync: This is available in two ways:
  (a) From the digital burst. The first 8 bits of the digital burst provide not only the line syncs, but by inversion of the relative positions of the words once every frame a rugged frame sync is provided as shown in Table 2 above. Alternatively, a distinct and unique field sync word can be inserted in line 625 as shown in FIG. 2.
  (b) From the video waveform. Line 1 of the video and line 313 provide a very rugged method of frame synchronisation, since these lines are distinguishable from any other line of each frame. The waveform of line 1 corresponds to $Y = -0.15$ and $U = -0.65$, while that of line 313 corresponds to $Y = -1.15$ and $U = +0.65$ ($V = 0$, ie these are lines of U chrominance). These values are outside the permitted RGB limits for picture information. Frame sync separation, field identification, line count and indeed line sync can be established from these lines.
 (iii) U/V identification. The U/V identification is derived directly by line count from the frame sync derived in 'b' above. The odd lines of the frame carry U information and the even lines carry V information.
 (iv) Extended definition synchronisation. For extended processing which may be introduced in the future, the 20.25 MHz clock required is recovered form the sound data burst.
 (v) Sound synchronisation. Sound synchronisation is obtained by obtaining line and frame synchronisation from the digital burst which then provides total synchronisation of the sound/data channel.
Turning now to the generation of sync signals at the receiver from the C-MAC waveform shown in FIG. 1, it will be recalled that the timings for the MAC receiver are derived from a line-locked 20.25 MHz clock. This has a period of $\approx 49$ nS, and there are 1296 clock samples per television line. As timing information for clock regeneration is derived from the data burst, it can be seen that timing information is only present for 15% of the time.

The synchronisation period consists of an 8-bit sequence transmitted at the start of each data burst. Of this the first bit is a run-in bit, and without synchronisation detection can be considered to be of no useful value. The other seven bits contain both the horizontal and vertical sync information in the format shown below.

From Table 2 it will be appreciated that a line sync can be considered to consist of either the word pair $W_1 W_2$ or the pair $W_2 W_1$.

A frame sync will then consist of the sequences $W_1 W_1 W_2 W_2$ or $W_2 W_2 W_1 W_1$ reversing a $W_1 W_2$ pair at the frame boundary.

The choice of words for $W_1$, $W_2$ is governed solely by the desired behaviour of the system under conditions of noise.

Both $W_1$ and $W_2$ should be chosen to have smallest possible correlation with shifted versions of themselves to prevent false lock occuring.

Based on computer search, the seven bit sequence 0001101 has been found to be optimum with regard to shifted versions of itself and also simulation of the sequence by video/data and noise.

In order to prevent confusion between $W_1$ and $W_2$ occurring in the reciever, a large Hamming distance between the two is desirable, and hence $W_2$ was chosen to be 1110010.

To keep the average D.C. level to $\frac{1}{2}$, the run in bit was chosen to be 1 for $W_1$ and 0 for $W_2$.

Receiver Sync Detection

Although only seven bits of sync information are sent on each line, the sequence of $W_1 W_2$ allows an effective line sync word length of 14 bits and an effective frame sync word length of 28 bits to be used. This is shown below:

| Line | Sync Word | Line Sync Sequence | Frame Sync Sequence |
|---|---|---|---|
| n | $W_1$ | $\left.\begin{array}{l}\end{array}\right\} W_1 W_2$ | |
| n + 1 | $W_2$ | | $\left.\begin{array}{l}\end{array}\right\} W_2 W_1$ |
| n + 2 | $W_1$ | $\left.\begin{array}{l}\end{array}\right\} W_1 W_2$ | |
| n + 3 | $W_2$ | | $\left.\begin{array}{l}\end{array}\right\} W_2 W_2^*$ |
| n + 4 | $W_2$ | $\left.\begin{array}{l}\end{array}\right\} W_2 W_1{}^!$ | $W_2 W_2 W_1 W_1$ (or $W_1 W_1 W_2 W_2$) |
| n + 5 | $W_1$ | | $\left.\begin{array}{l}\end{array}\right\} W_1 W_1^*$ |
| n + 6 | $W_1$ | $\left.\begin{array}{l}\end{array}\right\} W_1 W_2$ | |
| n + 7 | $W_2$ | | $\left.\begin{array}{l}\end{array}\right\} W_2 W_1$ |
| n + 8 | $W_1$ | $\left.\begin{array}{l}\end{array}\right\} W_1 W_2$ | |
| n + 9 | $W_2$ | | |

A line sync is therefore present on every line and a frame sync once a frame.

On the lines marked * a line sync is not detected due to the $W_1 W_2$ pair inversion to signal a frame sync. The ability of the system to stay in lock is not affected because the line sync detection is inhibited during these 2 lines once a frame lock is established.

The line marked ! contains a valid line sync, but the $W_1 W_2$ pair sequence is inverted. This can be used as a less rugged form of frame sync if desired for a simpler receiver and is indicated in FIG. 2.

A block diagram of the receiver detector is shown below in FIG. 4, and a brief description of the operation follows.

A phase locked loop (not shown) recovers the 20.25 MHz clock from the incoming data stream in a conventional manner. Even when not locked, the oscilllator of the phase locked loop is running at a nominal 20.25 MHz and so there is only scale difference in phase between the incoming data stream and the oscillator which results in long period of in phase running of the oscillator to facilitate lock-up.

The input serial data stream is then converted to an n bit wide parallel data stream by a serial to parallel converter 20, where n is the width of the line sync (ie n=7).

This is processed by a sync word recognition circuit 21 which converts the continuous 20 Mb/s data sream to a continuous error pattern. That is, the output represents the number of bits that the input is away from $W_1$. For example, in the case of $W_2$ this is the Hamming distance, or 7.

Line Sync Extraction

Since $p_{W_1} = \overline{p_{W_2}}$, by inverting the present sample and summing this with the same sample from the previous line, a maximum will occur with the line pair $W_1 W_2$ and a minimum with the pair $W_2 W_1$. By comparing these with $\rho_{amin}$ and $\rho_{amax}$ (the number of errors allowed in a sync word pair before a detection is deemed to be missed) line syncs may be extracted (along with other false detections due to random data) from the input data stream.

The figure $\rho_l$ may be used as a measure of the BER for the channel.

This operation is achieved by means of an inverter 22 which inverts the present sample and feeds it to one input of an adder 23 whose other input is supplied with the output from a line delay circuit 24. The output of the adder 23 is fed to a comparing circuit 25 where the 4 bit output of the adder 23 is compared with predetermined maximum and minimum numbers of errors and if the level of the output of the adder 23 falls between the maximum and minimum numbers of errors a line sync detection signal is generated.

A frame sync signal could also be extracted from the circuit 25 by detection when minimum and maximum signals are produced.

Frame Sync Extraction

This is preferably performed in a manner similar to line syncs with one important difference. The uninverted present sample is in this case summed with the same sample from the previous line in an adder 27. This gives a minimum for $W_1 W_1$ and a maximum for the sequence $W_2 W_2$. This result is delayed by two lines in a delay circuit 28 which comprises a 2×4 bit 2 line gated latch and added to the inverted undelayed signal in an adder 30.

Again this result has a minimum for $W_2 W_2 W_1 W_1$ and a maximum for $W_1 W_1 W_2 W_2$. By using a comparison circuit 31 for comparing this result with the number of errors allowable before a detection is not signalled, frame syncs may be detected.

The significant difference between frame sync and line sync extraction is the two line delay circuit 28. This is simply a two element shift register clocked with the regenerated line sync.

Once line lock has been established, the precise horizontal position of the frame sync within one of only 625 possible positions. It is effectively 'pointed to' by the line syncs. Hence the frame sync is made much more robust. This contrasts with a system using a frame sync word only ie where the frame sync may be in one of 625×1296 locations.

Acquisition of Lock

The previous section described in the recovery of the sync pulses. False sync pulses may also be generated by the random data in the channel, or by a particular arrangement of video signals. Therefore some sort of discrimination is required to extract the true syncs from any possible misdetections.

Figure 5:
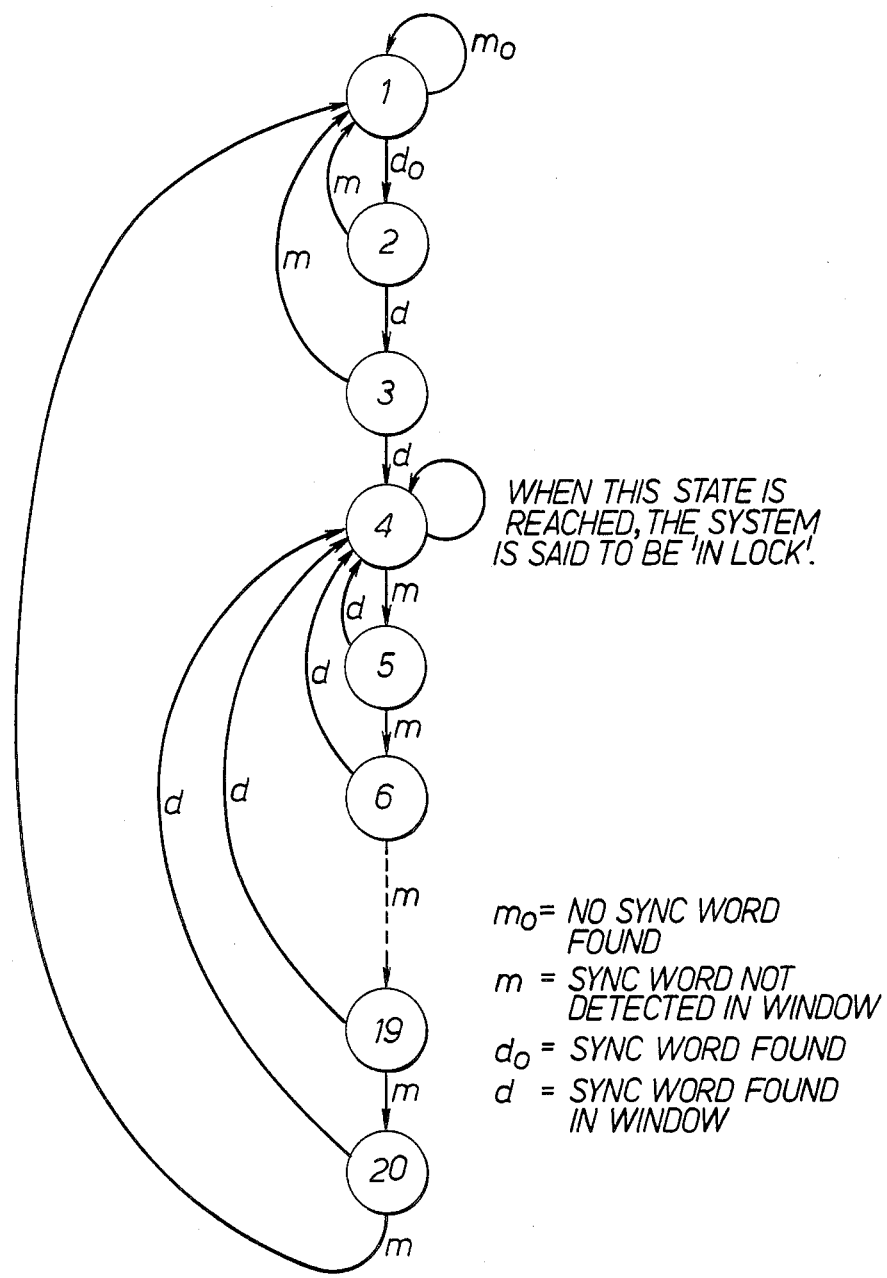
FIG. 5 shows a state diagram to explain the operation of the circuit shown in FIG. 4.

The process by which lock is acquired is governed by the state diagram shown in FIG. 5.

In the initial state any detection of the sync word is accepted, and a counter connected to the output of the comparing circuit 25 is moved to state ②.

If this detection is not the sync word then the counter returns to state ①.

If it is the sync word, the counter progresses to state ④ and the system has aquired lock.

Once line syncs have been acquired, the position of the data burst is known with certainty, and the clock recovery PLL is gated to prevent spurious signals (eg video) outside the burst increasing the amount of jitter on the clock.

After 16 consecutive mis-detections the system reverts to state ① and has lost lock.

The state diagram is the same for line and frame syncs, but acquisition of frame sync is not initiated until line lock is acquired when the position of frame sync can be indicated by line syncs.

The figures in this diagram allow lock to be acquired and held at a C/N of 0 dB in the UKIBA C-MAC system. This has been confirmed by experimental results.

Sync acquisition is thus by two distinct processes:
(1) Detection of line and frame sync.
(2) Lock acquisition and digital flywheeling.

Clock recovery is gated as soon as line lock is established (3 lines) thereby reducing clock jitter at low C/N. The clock has only to run ungated for 3 lines as opposed to running ungated accurately for at least one frame.

Figure 4:
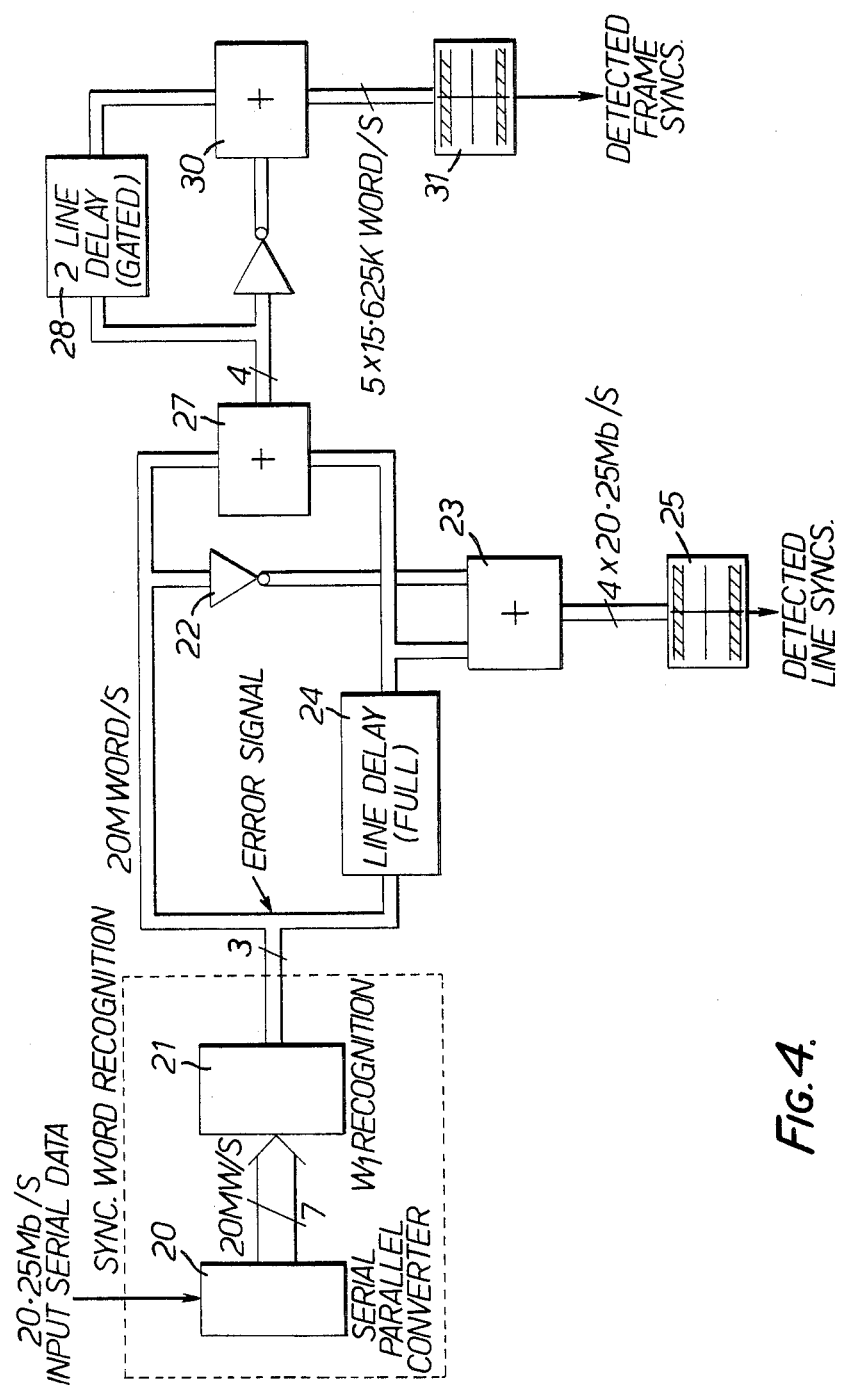
FIG. 4 shows a more detailed block diagram of a part of the receiver shown in FIG. 3.
Figure 6:
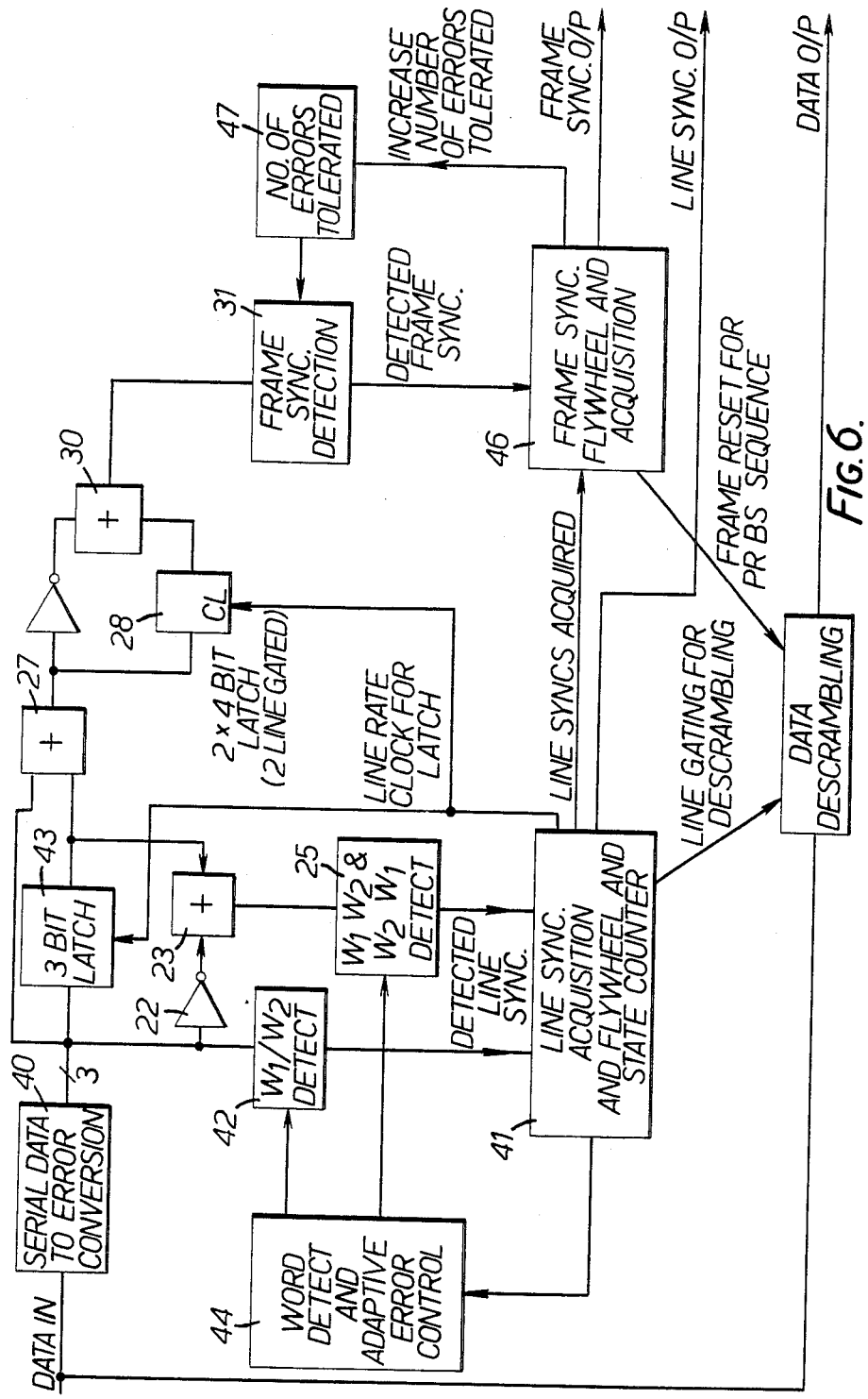
FIG. 6 shows a more detailed block diagram of modification to the block diagram shown in FIG. 4.

FIG. 6 shows a block diagram of a part of a receiver concentrating on sync detection and acquisition which differs from that shown in FIG. 4 in that it is much more simple and easy to instruct.

The previously described receiver required a fairly substantial amount of hardware, mostly running at the 20.25 Mb/s clock rate.

The receiver shown in FIG. 6 and described below has a considerably reduced amount of logic running at 20.25 MHz and in particular contains no line store. The same reference numerals are used for the same parts as in FIG. 4.

In FIG. 6, serial incoming data is inverted as before in a circuit 40 to produce a 3-bit error word. A line sync acquisition and flywheel and state counter circuit 41 receives an input from a word detection circuit each time a $W_1$ or $W_2$ word is detected by a word detection circuit 42 connected to the output of the circuit 40. It also receives the line sync detection signal generated by the comparing circuit 25. The counter circuit 41 generates a number of outputs among which is a line rate clock signal which is fed to a 3-bit latch 43 which replaces the line delay circuit 24 of FIG. 4.

The counter circuit 41 also acts as a reference signal generator for generating reference signals for application to a word detector and adaptive error control circuit 44, the reference signal being used to select the type of detection and number of errors tolerated by the detector 42 and the comparing circuit 25.

For frame sync detection, the arrangement is as described in relation to FIG. 4 with the 2 line delay 28 responsive to the line rate clock now generated by the counter circuit 41. Adaptive error control is achieved using a frame sync flywheel and acquisition circuit 46 and an error control circuit 47 which operates in a similar manner to the corresponding circuits described in relation to line sync detector.

The process of line sync acquisition will now be described with reference to FIG. 6 and FIGS. 7A and 7B.

Initially search for $W_1$ (only $W_1$ detections are output from a comparator on the output of the serial to error converter 40, allowing n errors).

If $W_1$ is found, the counter circuit 41 moves to state 1 (FIG. 7A) and searches for an occurrence of $W_2$ precisely 1296 clock cycles (1 line) later. This is also output form the word recognition circuit 42 since $W_1 = \overline{W}_2$.

If $W_2$ is not found, the counter circuit 41 reverts to state 0 (FIG. 7A) and continues to search for another occurrence of $W_1$.

If $W_2$ is found, then the probability of having found a line sync pair is quite high, and the receiver switches over to the sum of errors mode of the previous receiver, except that in this case, the line store is replaced by 3-bit latch 43 clocked by the assumed position of line sync found from the separate $W_1$ and $W_2$ detections.

Figure 7A:
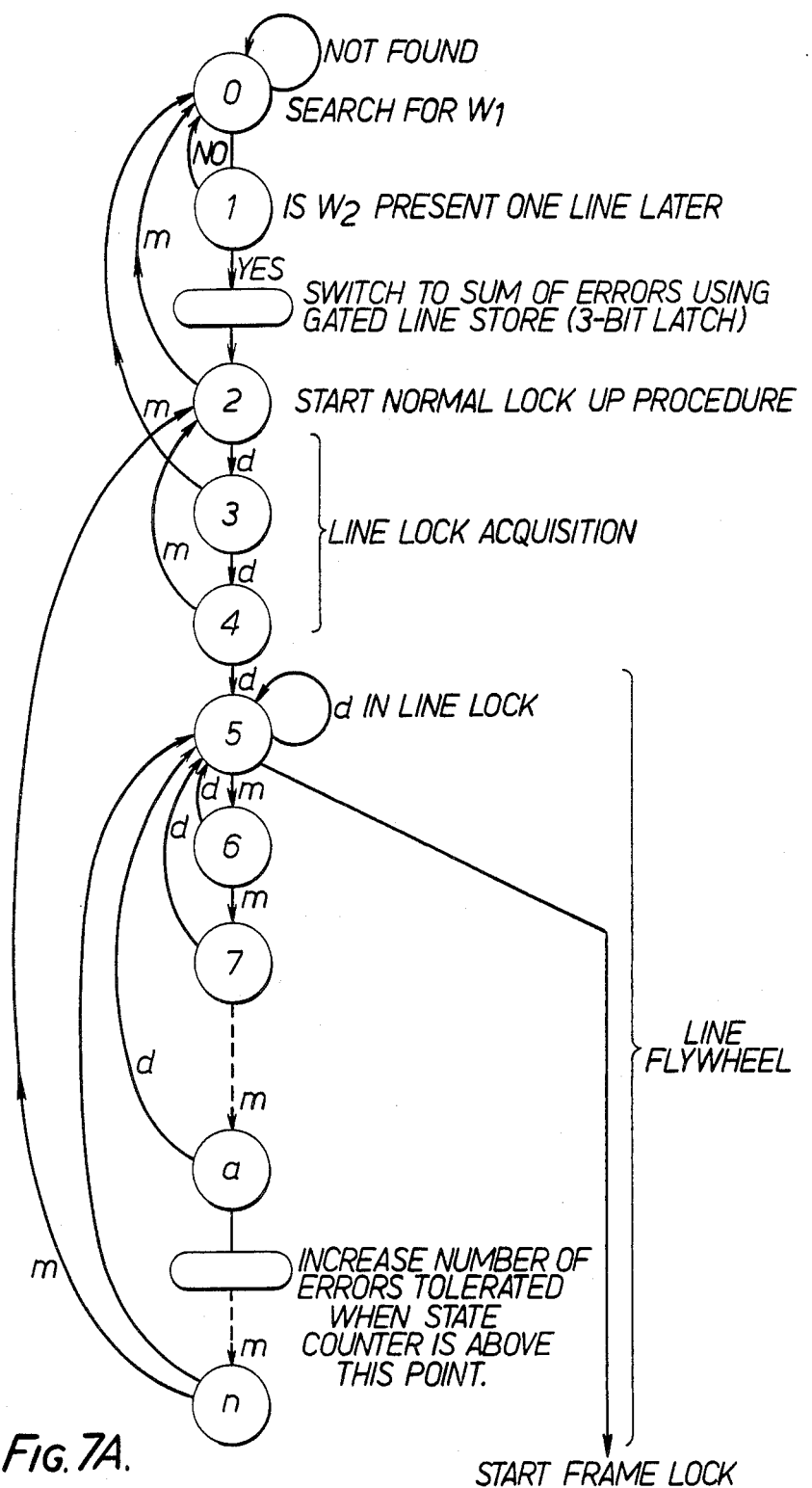
FIGS. 7A and 7B show state diagrams to explain the operation of the circuit shown in FIG. 6.
Figure 7B:
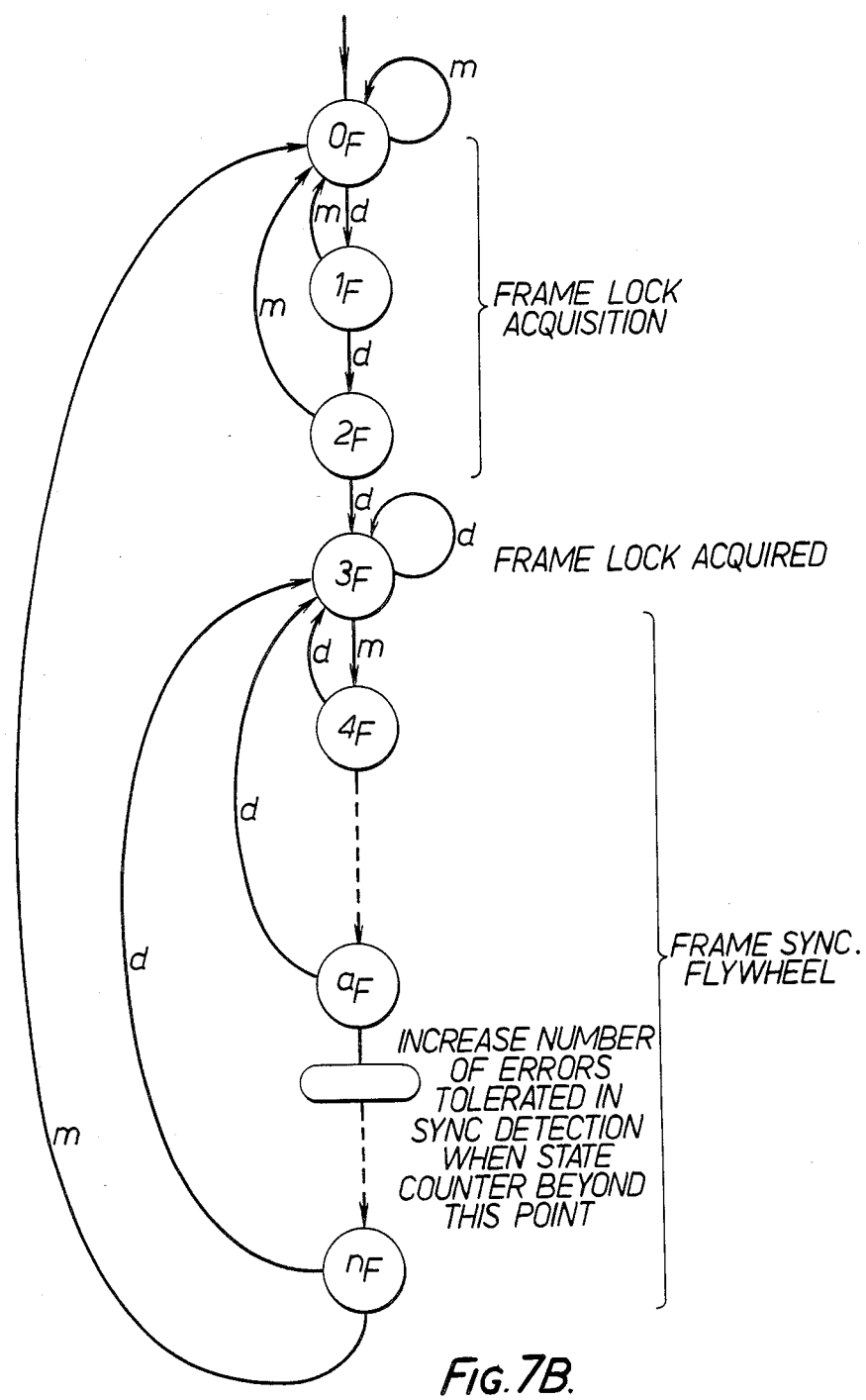

The counter circuit 41 is now at state 2 in (FIG. 7A).

If the syncs were correctly indentified then the conventional locking procedure will be followed and the counter circuit 41 will sit at state 5 (in FIG. 7A) and the receiver will have acquired line lock and a line sync output will be generated by the circuit 41.

At this point, the search for frame lock is initiated and when frame sync is acquired a frame sync output is generated from the circuit 46.

Frame syncs are detected using a 2 latch double line delay as before, and frame lock is also acquired as before.

In both line and frame cases, increasing BER will increase the probability of sync detection being missed and hence the counters 41 and 46 will advance from the in lock state. After a number of counts from these states ($n_l$ and $n_F$) the number of errors tolerated before a sync word detection is missed is increased using the circuits 44 and 47, therefore giving a greater probability of detecting a sync word in the presence of noise. Once a word is detected and the system returns to the in lock state, the number of errors tolerated is reduced to the original level.

Once frame lock is lost, re-acquisition takes place as normal.

Once line lock is lost, instead of reverting to state zero, the counter circuit 41 reverts to state 2.

There are two reasons for loss of line lock—loss of signal, or m consecutive mis-detections due to noise.

In the former case the counter circuit 41 will return to state 0 via state 2.

In the latter case, if sync words are detected there is the possibility of re-acquiring lock whilst still running in the two word mode thereby considerably reducing the interruption to sound the vision caused by loss of lock.

Adaptive error tolerance on either or both line and frame sync detection, allows sync extraction in the presence of a greater amount of noise (or higher BER). The arrangement shown in FIG. 6 has an increased initial lock up time with respect to that of FIG. 4. This is increased by an average of $1\frac{1}{2}$ lines in low BER conditions to approximately 40 lines at a BER of $10^{-1}$.

Although not shown in FIG. 3, it will be appreciated that a modified version of the counter circuit 41 in FIG. 6 will be used and that adaptive error control of the circuit 25 and/or circuit 31 is possible.

We claim:

1. Apparatus for receiving a television signal comprising time multiplexed analog video components and digital signals representing lines of at least one television frame, the television signal including synchronization information and in the digital signals of at least one of the lines of each television frame, at a predetermined position in the multiplex, an indication of further information, the receiving apparatus comprising;
  a demodulating device for demodulating at least part of the received television signal;
  a synchronization circuit responsive to an output of the demodulating device for the acquisition of synchronization information from the demodulated signal; and
  a data extraction circuit responsive to the synchronization circuit for extracting the indication of further information from the predetermined position in the demodulated signals, for the production of the further information from the indication of further information and for controlling the demodulating device to operate further on the received signal in one of a plurality of predetermined modes in accordance with the further information whereby to recover the component signals from the multiplex.

2. Apparatus according to claim 1, wherein the demodulating device comprises a first demodulator for demodulating the digital signals and a further demodulator controlled by the data extraction circuit for demodulating the analog video component signals.

3. Apparatus according to claim 1, wherein the indication of further information is in the form of a digital word at a predetermined location in the digital signals of a predetermined one of the lines of each television frame, and the data extraction means detects said digital word.

4. Apparatus according to claim 2, wherein the indication of further information is in the form of a digital word at a predetermined location in the digital signals of a predetermined one of the lines of each television frame and the data extraction means detects said digital word.

5. Apparatus according to claim 3, wherein the data extraction means controls operation of the demodulating device to alter the boundary between the digital signals and the multiplexed analog video components constituting the remainder of the line.

6. Apparatus according to claim 4, wherein the data extraction means controls operation of the demodulating device and the further demodulating device to alter the boundary between the digital signals and the multiplexed analog video components constituting the remainder of the line.

7. Apparatus according to claim 4, wherein the data extraction circuit controls operation of the demodulating device and the further demodulating device to alter the period of the demodulation of the analog video component portion of the multiplex of digital signals and analog component signals.

8. Apparatus according to claim 3, wherein the data extraction circuit controls operation of the demodulating device to alter the period of the demodulation of the analog video component portion of the multiplex of digital signals and analog video component signals.

9. Apparatus for receiving a television signal comprising time multiplexed analog video components and digital signals representing lines of at least one television frame, the television signal including synchronization information and in the digital signals of at least one of the lines of each television frame at a predetermined position in the multiplex, an indication of further information, the receiving apparatus comprising;
 a demodulating device for demodulating at least part of the received television signals;
 a synchronization circuit responsive to an output of the demodulating device for the acquisition of synchronization information from the demodulated signal; and
 a data extraction circuit responsive to the synchronization circuit for extracting of the indication of further information from the predetermined position in the demodulated signal for the production of the further information from the indication of further information, for controlling the demodulating device to operate further on the received signal in one of a plurality of predetermined modes according to the further information to recover the component signals from the multiplex, and for controlling the operation of the receiving apparatus for the subsequent processing of the demodulated analog video component signals in accordance with the further information.

* * * * *